United States Patent [19]

Tran

[11] Patent Number: 5,272,722
[45] Date of Patent: Dec. 21, 1993

[54] LOW LEVEL SERIAL TRANSCEIVER

[75] Inventor: Trung H. Tran, San Diego, Calif.

[73] Assignee: The United States of America as represented by the Secretary of the Navy, Washington, D.C.

[21] Appl. No.: 695,039

[22] Filed: Apr. 26, 1991

[51] Int. Cl.$^5$ .............................................. H04B 1/48
[52] U.S. Cl. .................................... 375/7; 375/36; 370/32; 307/279; 333/32
[58] Field of Search .................. 375/7, 36, 17, 76; 370/32; 307/279, 446, 448; 333/101, 105, 124, 32

[56] References Cited

U.S. PATENT DOCUMENTS

| | | | |
|---|---|---|---|
| 3,812,292 | 5/1974 | Tink et al. | 375/36 |
| 3,973,170 | 8/1976 | Hogan | 375/7 |
| 3,993,953 | 11/1976 | Tink | 375/36 |
| 4,317,205 | 2/1982 | Lam | 375/7 |
| 4,466,107 | 8/1984 | Stoner | 375/7 |
| 4,493,092 | 1/1985 | Adams | 375/7 |
| 4,736,385 | 4/1988 | Pratt et al. | 375/7 |
| 4,775,864 | 10/1988 | Herman | 375/7 |
| 5,119,365 | 6/1992 | Warner et al. | 370/32 |

Primary Examiner—Curtis Kuntz
Assistant Examiner—Young Tse
Attorney, Agent, or Firm—Harvey Fendelman; Thomas Glenn Keough

[57] ABSTRACT

A transceiver has a transmitter portion using serially coupled FETs coupled to low level positive and negative bias sources to enable a low power drain conversion of TTL input signals to low level serial data output signals for a coaxial data transmission cable and vice versa The transceiver also provides a constant 50 ohm impedance for the coaxial or triaxial transmission cable during active transmission periods, stand-by periods and power-off periods to provide an inexpensive method to transmit and receive 10 Megabit coded data via a coaxial or triaxial cable.

6 Claims, 3 Drawing Sheets

LOW LEVEL SERIAL TRANSCEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Some transceiver circuits which are coupled to a coaxial cable have the requirement to provide a constant impedance for the cable at all time to maintain the integrity of the communication system. In addition many times a transceiver of this type is remotely deployed for data gathering and is unattended for long periods of time and, as a consequence, must have a low power consumption. It is not uncommon that such a transceiver is one of a number of like transceivers in a interrelated network which is designed to share the transceiver function with a host of other related electronic functions. A design obstacle that frequently arises is that the various electronic functions might be provided in compact integrated circuits or microminiaturized packages where the heat dissipation problems associated with undue, high power consumption can and do impose severe operational limitations.

A typical, contemporary transceiver operating in the standby mode sinks 110 milliamps from its positive power supply and about 88 milliamps from its negative power supply. Some applications require as 45 amps from their negative supplies for just the transceivers This increased power consumption levels are largely attributed to the design complexity of the contemporary transceivers which also is reflected in a considerably increased cost per unit.

Thus, there is a continuing need in the state of the art for a transceiver improvement that has a low power consumption presenting substantially the same impedance to a coaxial cable during the active and standby modes of the transceiver.

SUMMARY OF THE INVENTION

The present invention is directed to providing an improved low power level serial transceiver that provides a substantially constant characteristic impedance at all time. A low level serial transmitter portion and a receiver portion are coupled to the cable by a transformer to provide DC isolation. A FET switch coupled to the transformer provides line impedance maintained at 50 ohms when the transceiver is powered off ( i.e. no power to the transceiver). Thus, reflection of input signals due to mismatch in impedance will be eliminated during power off periods. The transmitter portion receives two separate TTL data signals and has a pair of serially arranged FETs converting the two signals to tri-level signals during the 23 active mode. The tri-level signals are amplified by a fast op-amp to drive a 50 ohm load of the cable. When the transmitter is active or transmitting data, the receiver portion of the transceiver is disabled. This is done by a TTL controlled signal that disables comparators of the receiver portion. When the transmitter is not in the active mode (not transmitting data), the transceiver is in the stand-by mode and the receiver can receive data or be awaiting data. During power off periods, the transceiver has the same impedance as during the active and stand-by modes.

An object of the invention is to provide a more power efficient serial transceiver.

Another object is to provide a power efficient serial transceiver that is more cost-effective than contemporary designs.

Yet another object is to provide a serial transceiver providing a relatively constant line impedance at all time to an interconnected coaxial or triaxial cable.

These and other objects of the invention will become more readily apparent from the ensuing specification and claims when taken in conjunction with the appended drawings.

BRIEF DISCUSSION OF THE DRAWINGS

DESCRIPTION OF THE PREFERRED EMBODIMENT

Figure 1:
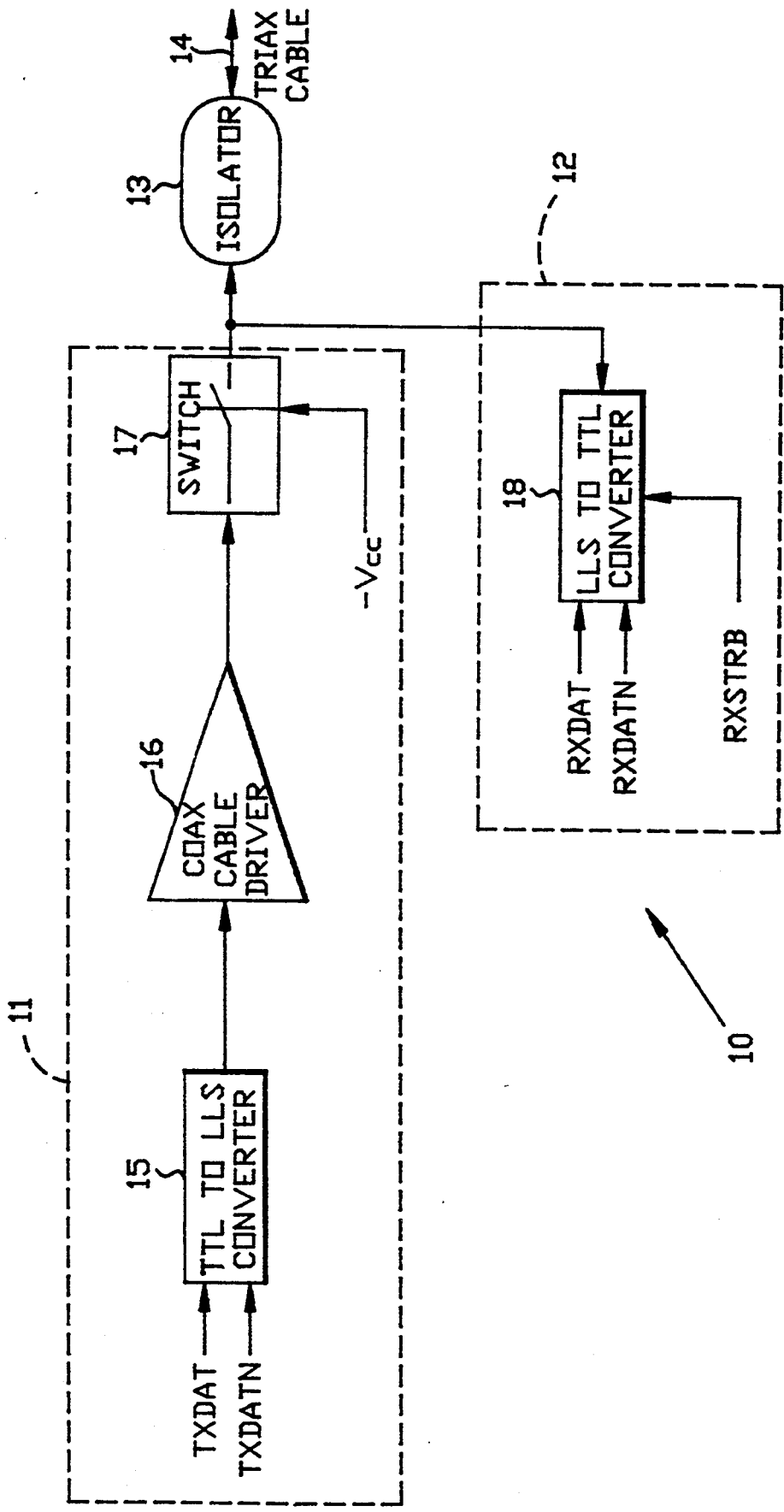
FIG. 1 is a block diagram of the low level serial transceiver fabricated in accordance with this inventive concept.

Referring now to FIG. 1 of the drawings, low level serial transceiver 10 includes a transmitter portion 11 and a receiver portion 12 coupled via an isolator portion 13 (coupling transformer) to a triaxial or coaxial data transmission cable 14. The cable extends to remote portions of a communication system and may be interconnected to a number of low level serial transceivers fabricated in accordance with this inventive concept to provide an inexpensive method of utilizing, for example, coaxial or triaxial cable to transmit and receive 10 Megabit Manchester coded data.

Figure 2:
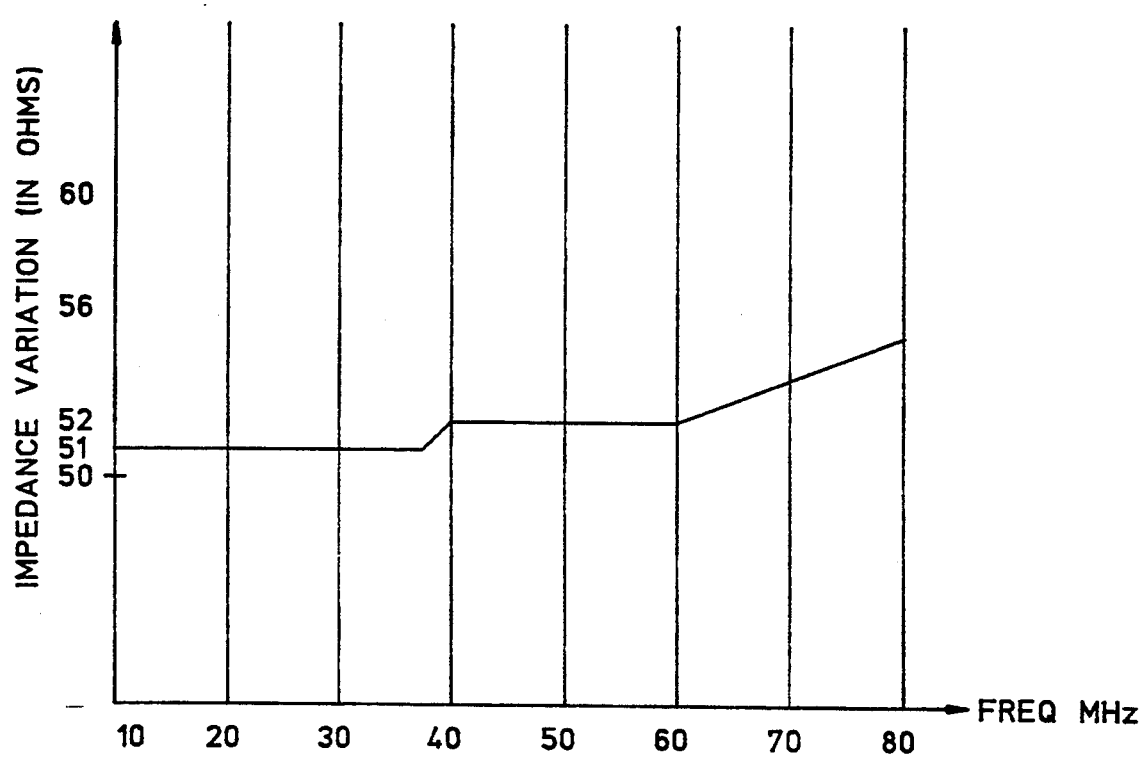
FIG. 2 is a graph showing impedance variation vs. a frequency.
Figure 3:
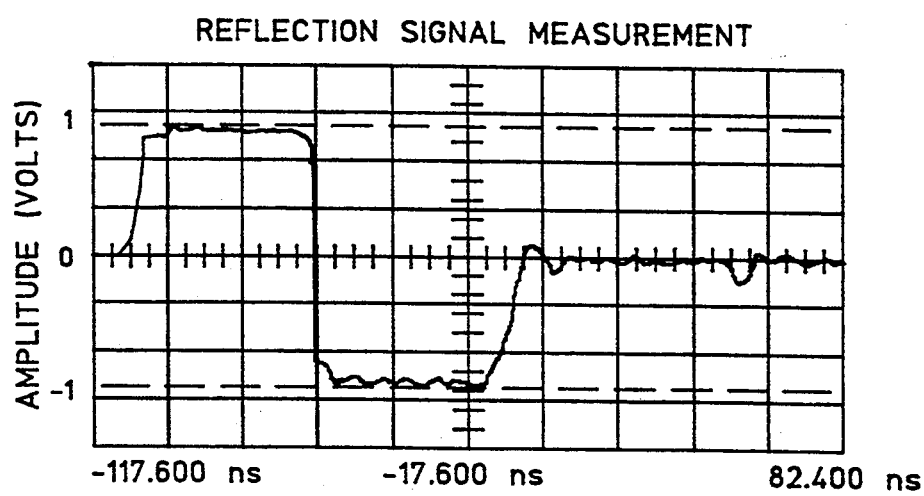
FIG. 3 is a graph showing reflection signal measurement of 1 volt peak to peak input signal showing no more than a 10% reflection.
Figure 4:
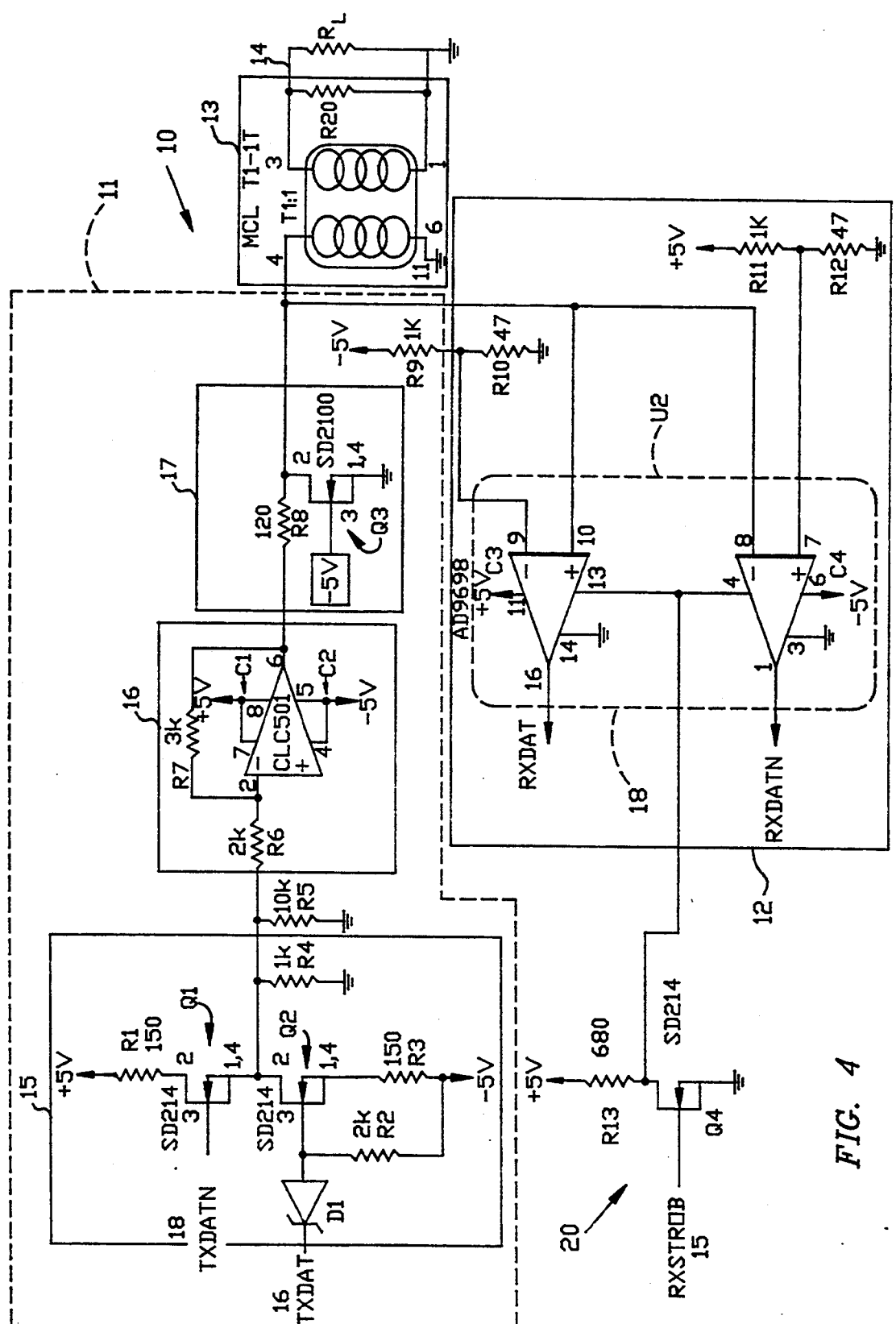
FIG. 4 is a schematic depiction of the low level serial transceiver of FIG. 1.

The cable joined to an interconnected system having, for example, a number of transceivers, requires a constant line impedance at each transceiver. Accordingly, it has been a main consideration to assure that a constant characteristic impedance is presented for cable 14 while each transceiver 10 is operating in the active mode as it is transmitting standby mode as it is receiving or awaiting the next message or when the transceiver is powered off. An impedance of 50 ohms +or−2 ohms at the isolator portion is measured from 10 MHz to 80 MHz to assure that no more than 10% of a 10 MHz input signal is reflected, see FIGS. 2 and 3.

When the active mode (transmitting mode) is invoked, TTL to LLS (low level serial) converter 15 is actuated and FET switch 17 also is actuated to turn off by the application of the −5.0 power to the gate of FET Q3. Simultaneously, while in the active or transmitting mode, Q1 and Q2 of converter 15 encode the two TTL inputs TXDATN and TXDAT to a three-level signal of +v, −v and ground. This three-level signal is amplified by fast operational amplifier U1 of coaxial cable driver 16 to drive a 50-ohm impedance load $R_L$ which is associated with the distal end of cable 14.

FET Q3 of switch 17 is uniquely fabricated to function as an impedance matcher between driver circuit 16 and load $R_L$ in a manner to maintain a unique feature of this transceiver, namely, that its impedance maintains a 50 ohm magnitude in either the active mode (while transmitter portion 15 is transmitting), the stand-by mode (during receiving by receiver portion 12 or awaiting data), or is in a power-off mode (no power to the transceiver). When transmitter portion 11 is power on (transceiver 10 is in the active mode), the negative 5 volt to the gate of FET Q3 will turn off FET Q3 and make switch 17 act like an open circuit. In the stand-by mode, resistors R8 and R20 form the impedance of the transceiver and will make the transceiver appear to be 50 ohm. When there is no power to the transceiver, the Q3 transistor will be turned on because the absence of the negative 5 volts to the gate of this FET Q3 transistor. When this transistor turns on, there is a resistance of 120 ohm across to ground. The high impedance of the driver (U1) (when there is no power) will present an open circuit at that point to the interface so the resistance to the transistor and R20 will be a component that makes the transceiver appear to be 50 ohm. In this manner, low level transceiver 10 maintains 50 ohms impedance looking into the transceiver from the interconnecting end of cable 14 while in the active mode (while transmitter portion 15 is transmitting), the stand-by mode (during receiving by receiver portion 12 or awaiting data), or is in a power-off mode (no power to the transceiver).

When transmitting or operating in the active mode (transmitter portion 11 transmitting) data will not be echoed back into receiver portion 12 since an RXSTROB signal circuit 18 applies an RXSTROB signal to receiver portion 12 during transmission. The RXSTROB signal acts as a control signal to disable a comparator $U_2$ circuit in the receiver portion. In the receiving mode or the standby mode, the RXSTROB signal is absent so that low level serial (LLS) data signal coming in over cable 14 is fed to a dual comparator circuit $U_2$ whose outputs are TTL signals RXDAT and RXDATN.

During the active mode, that is when converter 15 is activated by applying the +5 volts and −5 volts across the serially connected FETs Q1 and Q2, an adequate and appropriate power low level power is provided for a suitable data transmission. During the stand-by mode of operation, that is when converter 15 is not transmitting, the transceiver sinks to about 80 milliamps from the +5 volts supply and 24 milliamps from the −5 volts power supply. This represents a savings of about 70% power when compared to other transceivers with the resultant power saving and greatly reduced power dissipation which might compromise associated integrated circuits. This power saving is attributed to the simplicity of the design which makes this transceiver use much less power. The components for the design of this circuit were selected to assure the use of less power and for increased reliability.

Obviously, many modifications and variations of the present invention are possible in the light of the above teachings. It is therefore to be understood that within the scope of the appended claims, the invention may be practiced otherwise than as specifically described.

I claim:

1. A low level serial digital transceiver capable of operating in the active and passive mode for presenting a constant impedance during active mode, stand-by-mode and power-off mode operation to provide a cost effective method to transmit and receive 10 Megabit Manchester coded data via a cable network;

a transmitter portion including:

means coupled to receive two separate data streams for converting into representative LLS signals during operation in said active mode, means coupled to the converting means for amplifying said representative LLS signals to a predetermined amplitude during operation in said active mode, and means connecting the amplifying means to said cable network for providing said constant impedance during operation in said active mode, stand-by mode and power-off mode, a receiver portion including;

means coupled to the constant impedance providing means and said cable network for receiving LLS data signals thereon during operation in said stand-by mode, the receiving means having a disabling circuit connected thereto to disable a comparator circuit from receiving said amplified representative LLS signals during operation in said stand-by mode; and an isolator connected to said transmitter portion, said receiver portion and said cable network for coupling said transmitter portion and said receiver portion to said cable network during said active mode, stand-by mode and power-off mode operation.

2. A low level serial digital transceiver according to claim 1 in which said converting means includes two serially connected FETs connected to a positive and a negative power supply.

3. A low level serial digital transceiver according to claim 2 in which said constant impedance providing means includes an FET coupled suitably coupled to a bias supply and resistors to maintain said constant impedance.

4. A low level serial digital transceiver according to claim 3 in which said disabling circuit includes an appropriately connected FET and said comparator circuit includes an appropriately connected pair of operational amplifiers.

5. A low level serial digital transceiver according to claim 1, 2, 3 or 4 in Which said cable network includes a coaxial date transmission cable.

6. A low level serial digital transceiver according to claim 1, 2, 3 or 4 in which said cable network includes a triaxial date transmission cable.

* * * * *